United States Patent [19]

Reece

[11] Patent Number: 4,862,824
[45] Date of Patent: Sep. 5, 1989

[54] BREADER HAVING IMPROVED DOUGH BALL SEPARATION

[76] Inventor: Vernon E. Reece, 1936 W. 47th Place, Tulsa, Okla. 74125

[21] Appl. No.: 226,223

[22] Filed: Jul. 29, 1988

[51] Int. Cl.$^4$ ............................................. B05C 19/00
[52] U.S. Cl. ....................................... 118/22; 118/23; 118/26
[58] Field of Search ...................... 118/610, 23, 29, 19, 118/13, 26, 31, 22; 209/234, 248, 370, 373

[56] References Cited

U.S. PATENT DOCUMENTS

| | | | |
|---|---|---|---|
| 2,770,212 | 11/1956 | Marante | 118/610 |
| 3,129,167 | 4/1964 | Frangos | 118/23 |
| 3,520,277 | 7/1970 | Gordon | 118/23 |
| 3,910,227 | 10/1975 | Reece | 118/29 |
| 4,182,260 | 1/1980 | Reece | 118/26 |
| 4,550,677 | 11/1985 | Reese et al. | 118/31 |

Primary Examiner—Willard Hoag
Attorney, Agent, or Firm—Head & Johnson

[57] ABSTRACT

An apparatus for separating dough balls from reusable breading having a container for holding breading containing dough balls, the container having an aperture in the bottom thereof for selectably discharging the breading having dough balls co-mingled therewith, a sifter having foraminous portions positioned below the container bottom aperture and having a bottom with a central opening therein, an actuator to cause breading to be sifted through the foraminous portions, a plurality of concentric circular walls having openings therethrough arranged to cause dough balls to be separately discharged through the sifter central opening, a breading collector container below the sifter to receive breading sifted from the sifter, and a dough ball collector directly below the sifter central opening for separately receiving dough balls passing therethrough. In one embodiment the dough ball collector is removably supported within the breading collector and in another embodiment, the breading collector has an upright tubular member communicating with an opening in the bottom and in alignment with the sifter central opening and the dough ball collector is positioned below the breading collector.

3 Claims, 9 Drawing Sheets

BREADER HAVING IMPROVED DOUGH BALL SEPARATION

SUMMARY OF THE DISCLOSURE

In the food industry it is a practice to prepare certain foods by dipping pieces of the food in a batter and then forming a breading on the food by subjecting the batter covered food to a breading mixture. This method of food preparation is most frequently employed in the frying of pieces of chicken. The pieces of chicken are first dipped in a liquid batter and then placed in breading which is primarily flour with spices and seasoning mixed with it. The pieces of chicken are tumbled manually within the breading so that the breading adheres to the batter forming a coating on the pieces of chicken. The pieces of chicken may then be fried such as in a pan of hot liquid grease.

In the process of breading the batter-dipped pieces of chicken, a certain amount of the liquid batter separates from the pieces of chicken and formulates dough balls in the breading mixture. These dough balls tend to grow in size as the mixture is being used. The dough balls constitute a non-usable by-product of the process of breading pieces of chicken. Any breading remaining in the container after the breading process is completed can be reused; however, before the breading can be used the dough balls must be separated from it.

For this reason sifters have been developed for sifting the breading to remove the dough balls. For reference to prior issued patents which provide sifters for use in breading operations, reference may be had to U.S. Pat. Nos. 3,910,227; 4,182,260 and 4,550,677. These three prior issued U.S. Patents are incorporated herein by reference.

Each of these prior issued patents demonstrate improvement in apparatus for breading pieces of chicken. U.S. Pat. Nos. 3,910,277 and 4,182,260 are directed toward improved sifters wherein the dough balls remain in the sifters and must be removed from the sifters by lifting the sifter mechanism out of the breading machine and dumping the dough balls. U.S. Pat. No. 4,550,677 shows a means of sifting wherein the dough balls are separated from the breading and separately discharged. In this last-mentioned patent, the dough balls travel down a chute extending at an angle relative to the sifter. A substantial structure for conducting the sifted breading to a container below the sifter is required since it must provide means for pasasge of the angularly-shaped dough ball conduit out the sidewalls of the structure. This system is inconenient to use and requires an increased number of parts which must be washed and sanitized.

The present invention is directed toward an improvement in the breaders and sifters as shown in these previously issued United States Patents. In the present improved breading apparatus, a breading container is provided for holding breading which, in the process of breading, will accumulate dough balls therein. The breading container has an opening in the bottom for selectably discharging breading having dough balls comingled. In the typical operation, after the breading procedure has been completed and a sufficient amount of dough balls have accumulated in the breading, the operator uncovers the aperture in the bottom and allows the breading and dough ball mixture therein to pass through the aperture downwardly through the opening.

Below the opening is a sifter having foraminous cylindrical sidewalls and a foraminous bottom. The sifter is positioned directly below the aperture in the breading container so that breading having dough balls co-mingled therethrough pass directly into the sifter. The sifter has a labyrinth path arrangement in the bottom which communicates with a central bottom opening. As the sifter is actuated by sequential oscillation back and forth around a vertical axis, the breading is caused to pass through the walls and through the bottom of the sifter whereas the dough balls pass through the labyrinth path and through the bottom central opening. The dough balls are discharged into a separate dough ball collector which is positioned directly below the sifter central opening.

In one embodiment the dough ball collector is positioned within the breading collector, both of which are positioned directly below the sifter. In a second embodiment, the breading collector has a bottom with an opening therein and an upright tubular conduit communicating with the opening. The tubular conduit is in alignment with the sifter central opening so that dough balls passing through the sifter central opening pass downwardly through the upright tubular conduit. The dough ball collector is positioned below the breading collector and directly below the upright tubular conduit to collect the dough balls passing through it.

A better understanding of the invention will be had with reference to the following description and claims, taken in conjunction with the attached drawings.

DESCRIPTION OF THE DRAWINGS

FIG. 7 is a fragmentary view taken along the line of 7—7 of FIG. 5 of the mechanism for coupling the oscillator shaft to the sifter basket.

FIG. 8 is a bottom view of the fragmentary view of FIG. 7, showing the means of retaining the oscillator shaft to the sifter basket.

FIG. 9 is the same view as FIG. 8, but showing the latching mechanism in the open position.

FIG. 10 is an exploded view showing the sifter basket separated from the oscillator arm.

FIG. 11 is a top view of the oscillating rod after the basket is separated therefrom as taken along the line 11—11 of FIG. 10.

FIG. 12 shows a portion of the breading collector partially cut away and showing the sifter and portions of the breading container in dotted outline.

DESCRIPTION OF THE PREFERRED EMBODIMENT

Figure 1:
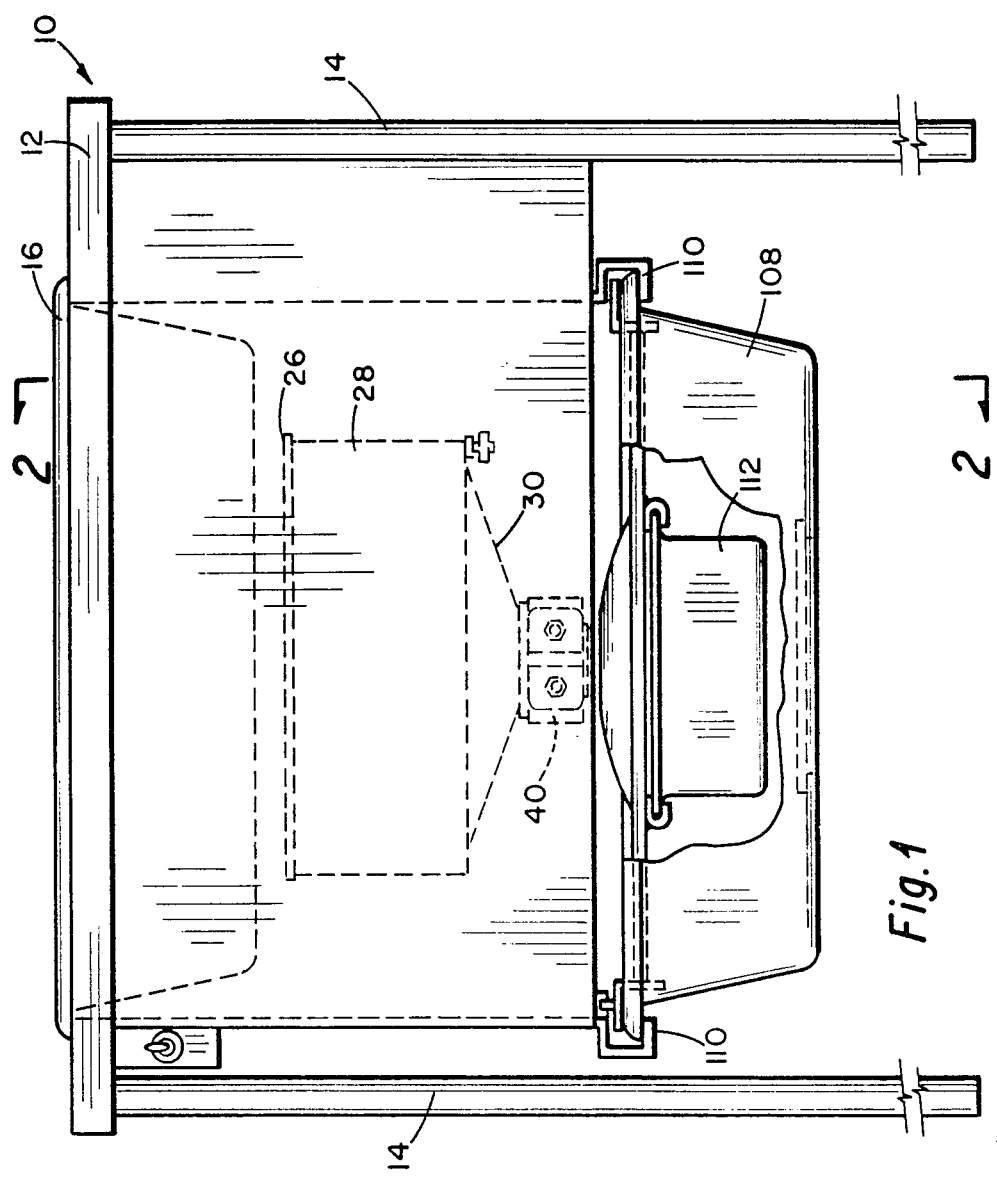
FIG. 1 is an elevational view of an aperture which employs the principles of this disclosure, shown partially cut away in the lower portion and some of the internal portions being shown in dotted outline.
Figure 2:
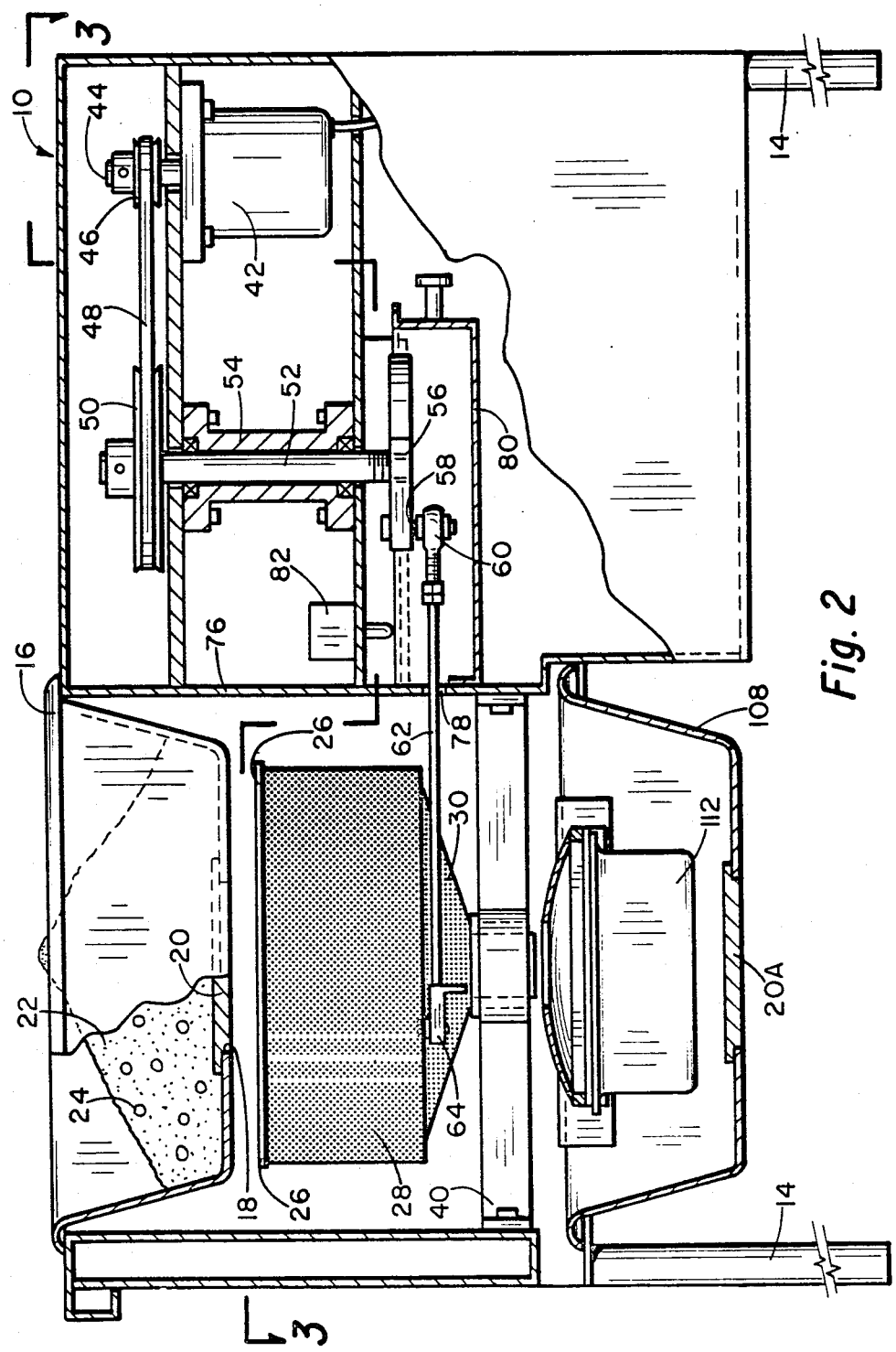
FIG. 2 is an elevational cross-sectional view taken along the line of 2—2 of FIG. 1, showing internal mechanisms of the breading apparatus.
Figure 3:
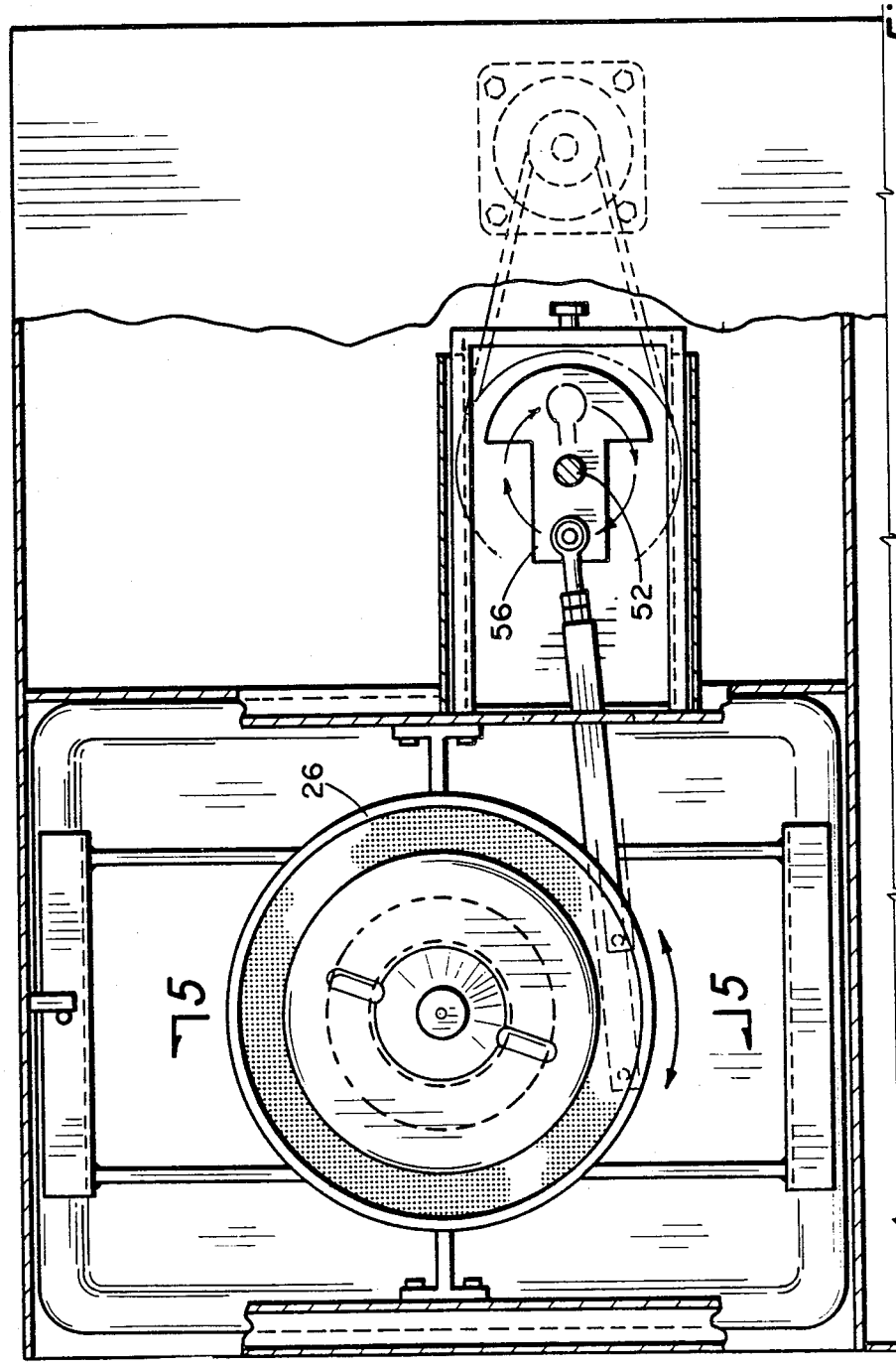
FIG. 3 is a horizontal cross-sectional view taken in three different planes along the line 3—3 of FIG. 2, showing a downwardly looking view of mechanisms making up the improved breading apparatus.

Referring to the drawings, and first to FIGS. 1, 2, and 3, the elements making up the breader of this invention are shown in a first embodiment. The breader is indicated generally by the numeral 10 and includes a table 12 with legs 14 supporting it. The table has an opening therein receiving a first container 16 which is also referred to as breading container. The breading container 16 as shown in FIG. 2, has an opening 18 therein in the bottom having a removable closure. Shown in the breading container is breading material 22 which is primarily made up of flour with spices and seasonings. During the process of breading batter covered pieces of chicken (not shown), dough balls 24 are formed in the breading. The purpose of this breader device is, first to provide a convenient location for the breading operation—that is, for the support of breading container 16; and second, after dough balls are formed in the breading, to provide a means of separating the remaining dough balls so that the breading material may be reused.

Figure 5:
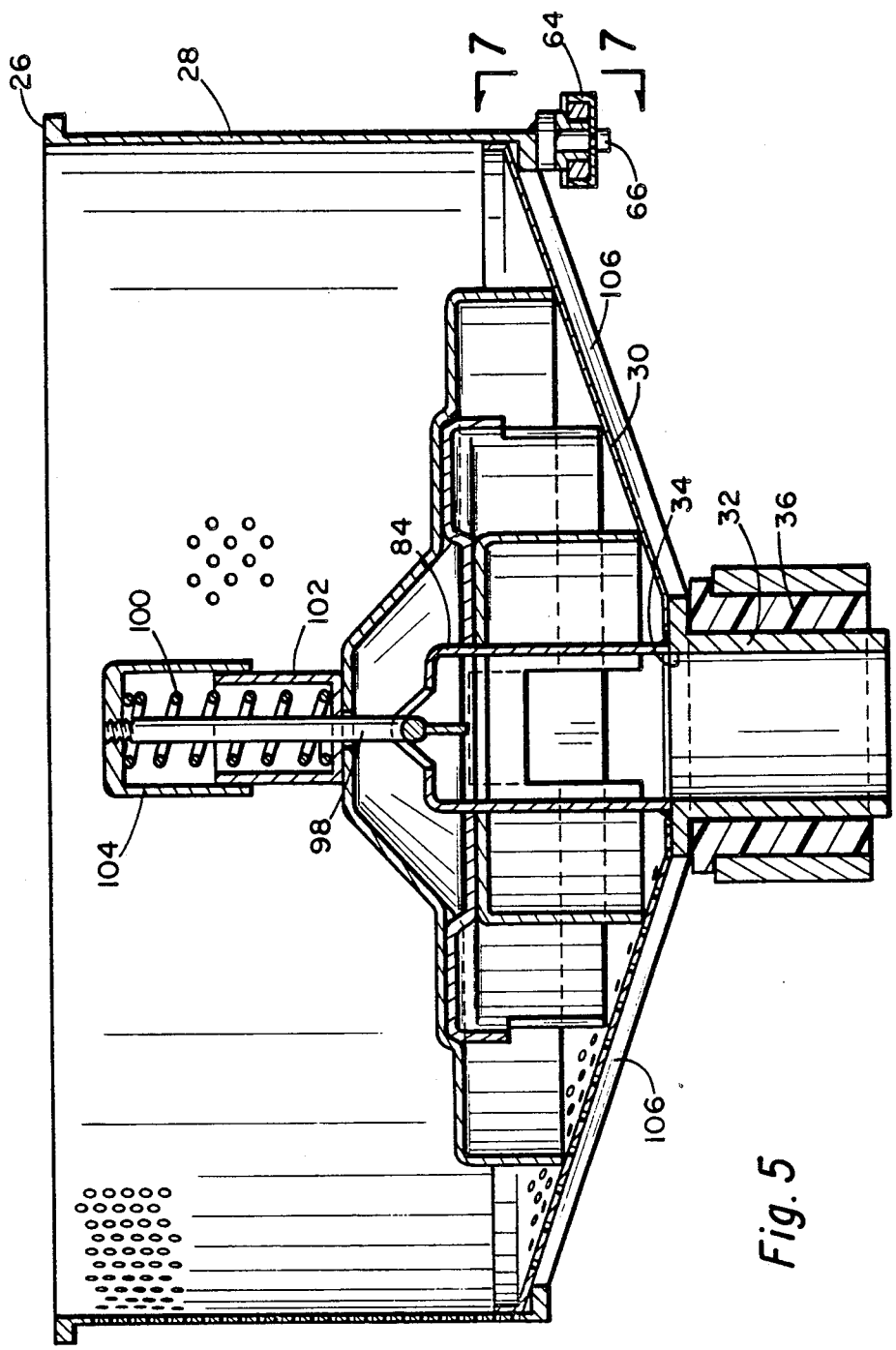
FIG. 5 is an enlarged scale, elevational crosssectional view of one embodiment of the sifter mechanism which includes means for causing the breading to be discharged through the sidewalls and bottom of the sifter and in which the dough balls intermixed with the breading are separated and passed through a bottom central opening.

Positioned below the breading container 16 is a sifter 26. The sifter has a cylindrical foraminous sidewall 28 and a foraminous tapered bottom 30. As shown in FIG. 5, the sifter includes a tubular portion 32 communicating with a central opening 34 in the bottom of the sifter. The tubular portion 32 forms a pivotal member around which the sifter is oscillated. A plastic sleeve 36 surrounds the tubular portion 32 and in turn is supported by a collar 38 which is held to the table by structural members 40, as shown in FIG. 2. The plastic sleeve serves as a bearing.

To separate the dough balls 24 from the breading 22 the closure 20 is removed allowing the breading and comingled dough balls to pass downwardly into the sifter 26. In FIG. 2, the method of oscillating the sifter is best illustrated. a motor 42 drives a shaft 44 having a sheave 46 thereon which, by means of belt 48, rotates a second sheave 50 attached to spindle 52. The spindle 52 is rotatably supported by a bearing block 54. At the other end of spindle 52 a crank arm 56 is affixed. The crank arm includes a counterweight portion as best seen in FIG. 3.

Extending from the crank arm is a pin 58. Received on the pin is a bearing 60 and a connecting rod 62. The other end of the connecting rod has a coupling member 64 which removably attaches to a pin 66 extending from the lower outer portion of the sifter basket 26.

It can be seen that when motor 42 is energized the rotation of crank arm 56 oscillates connecting rod 52 and thereby reciprocally oscillates sifter basket 26 about a vertical axis which passes central through the basket tubular portion 34.

FIGS. 7 through 11 show the details of the preferred embodiment for attaching the connecting rod 62 to pin 66 extending from the sifter basket 26. Affixed to the outer end of the connecting rod is a collar 68 having an opening 70 therein. Pin 66 is received in the opening 70. Slideably received upon the connecting rod is the coupling member 64. As shown in FIG. 9, the coupling member has a slot with an enlarged circular opening 72 which, when the slot is expanded, permits the opening to releasably engage pin 66. The pin is provided with a reduced diameter circumferential groove 74 as shown in FIG. 10 which receives the opening 72 in the coupling member. When the coupling member is slid in a direction away from pin 66, the pin may be removed from engagement with the connecting rod 62. Since the sifter tubular portion 32 is slideably received within the plastic bearing 36, by moving the coupling member 64 the entire basket 26 may be easily removed for cleaning.

Figure 6:
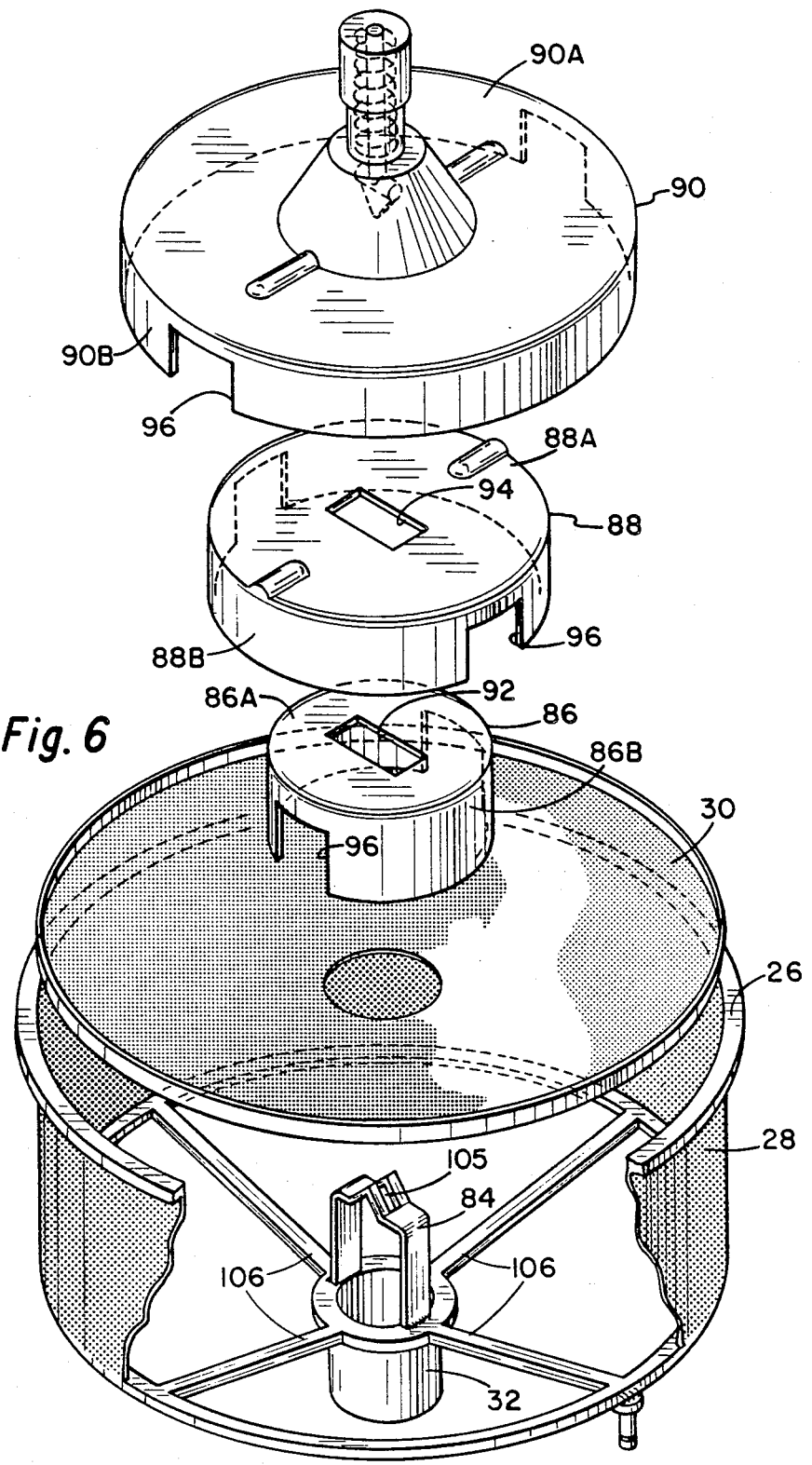
FIG. 6 is an exploded isometric view of the sifter mechanism as shown in FIG. 5.
Figure 16:
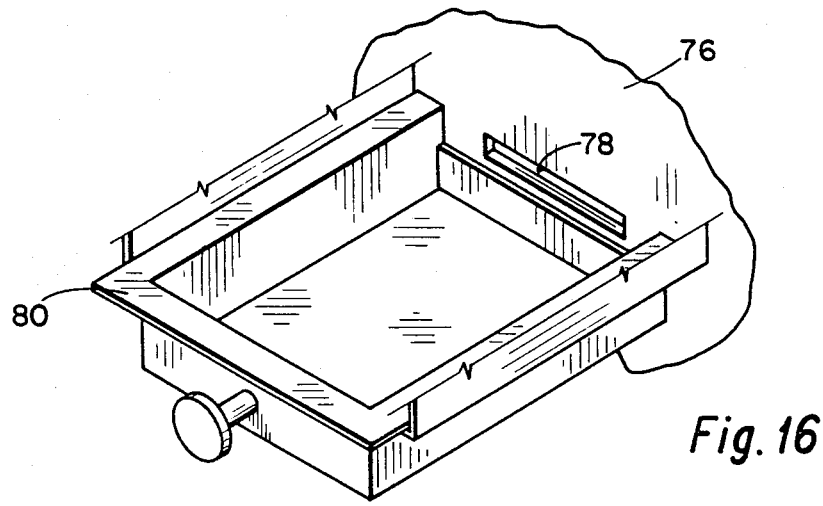
FIG. 16 is an isometric view showing the collector tray which is placed beneath the sifter oscillator mechanism for collecting any breading which inadvertently passes from the area of the sifter into the mechanical compartment of the breader.

Referring again to FIG. 2, it can be seen that the underneath of table 10 is divided basically into two portions. The first portion includes the breading container 16 and the sifter 26 and is separated from the other portion by a wall 76. Since breading passes downwardly within the interior of the table containing the sifter portion, the function of wall 76 is to separate the oscillation mechanism from the area containing breading. In order to permit transfer of reciprocal energy to the sifter, a small slot 78 is provided in wall 76 through which the connecting rod 62 passes. Some breading will inevitably migrate through this small slot. For this purpose, a tray 80 is slideably positioned directly below the crank arm 56 and in communication with the opening 78. The tray serves to collect any breading which might migrate through the opening 78. To ensure that the tray 80 is in position before motor 42 may be energized, a microswitch 82 is positioned so that it is actuated when the tray is in position and non-actuated when the tray is out of position. FIG. 16 shows an isometric view of the tray 80 and the opening 78 in the wall 76. FIG. 6 does not show the crank arm nor the connecting rod. The specific means of retaining the tray 80 in position to receive breading passing through opening 78 may vary compared to the illustrated arrangement.

Referring to FIGS. 5 and 6, the mechanism for separating the dough balls from the breading is shown. Extending upwardly from the sifter basket tubular portion 72 is a bracket 84. Received on the bracket are three inverted, concentric cup-shaped members 86, 88 and 90. The members vary in diameters with the smallest on the bottom and the largest on the top. Members 86 and 88 have openings 92 and 94, respectively, which receives bracket 84.

Each of the inverted cup-shaped members 86, 88 and 90 includes a top and a downwardly extending cylindrical wall portion. Specifically, first cup-shaped member 86 has a top 86A and a downwardly extending cylindrical wall 86B. In like manner, intermediate cup-shaped member 88 has a top 88A and cylindrical wall 88B; and member 90 has a top 90A and a cylindrical wall 90B. Each of the walls 86B, 88B and 90B has at least one notched opening 96 therein. The inverted cup-shaped members are arranged so that the openings 96 are not in alignment, but are offset from each other thereby creating a labyrinth path through which dough balls must travel to reach central openings 34.

Affixed to the top 90A of the uppermost inverted cupshaped member is a downwardly extending hook 98 which is retained in an upwardly biased position by a spring 100. Encompassing the spring are telescoping members 102 and 104 with member 104 being attached to the upward end of hook 98. When the upper telescoping member 104 is pressed downwardly against the resistance of spring 100, the hook 98 may be rotated to disengage it from a slight opening 105 in the top of bracket 84. In this manner, the inverted cup-shaped members 86, 88 and 90 may be secured to or removed from within the interior of sifter basket 24.

As shown in FIG. 6, the sifter basket bottom 30 is preferably removable from the basket sidewall portion 28 and, to support the tubular portion 32 to the sidewall portion 28 and legs 106, are employed.

Referring again to FIGS. 1 and 2, positioned directly below the sifter 26 is a second container or breading receptor 108. The breading receptor 108 may be identical in size to the breading container 16, and it has an opening in the bottom with a cover 20A. As breading passes downwardly through the foraminous portions of sifter 26, it passes into the breading receptor 108. After all of the breading has been discharged from the breading container 16 and has passed through the sifter 26, the breading receptor 108 may be removed and exchanged in position with the breading container 16.

The breading receptor 108 may be supported in position by a variety of means. In the illustrated arrangement, channels 110 receive the outer edges of the container and support it in position below the sifter.

Figure 4:
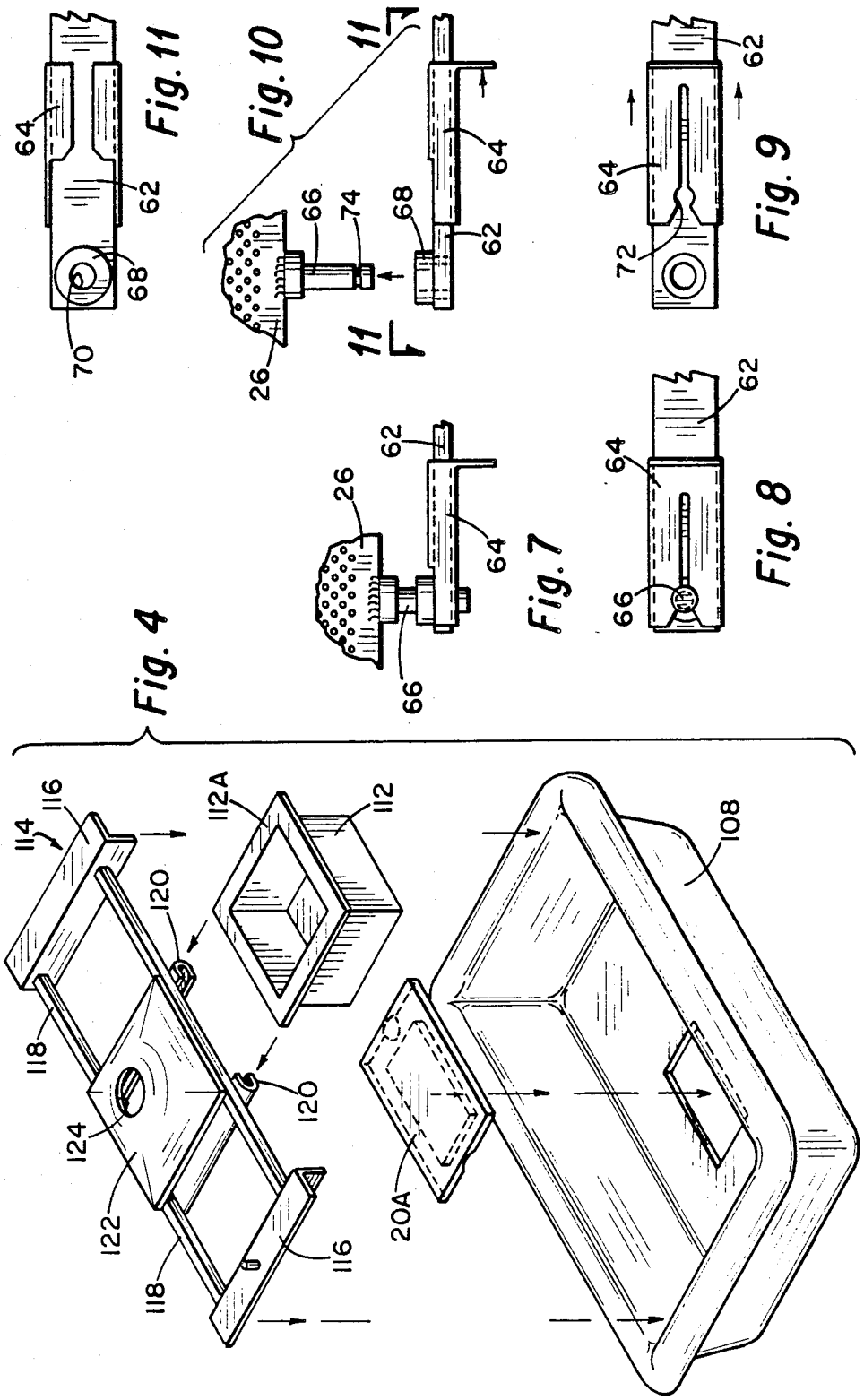
FIG. 4 is an exploded view of one embodiment of the breading collector with the dough ball collector supported therein.

To receive the dough balls which are separately discharged from the sifter, a third container or dough ball collector 112 is employed. The dough ball collector 112 is of smaller dimensions than the breading collector 108 and is removably supported within the breading collector as best shown in FIG. 4. A bracket member 114 extends across the breading collector 104 to engage the upper lips thereof by means of angle members 116. Affixed to stretchers 118 extending between the angle members 116 are channels 120 which slideably receive the upper edge 112A of dough ball collector 112.

Positioned on top of the stringer 118 is a dome 122 having a central opening 124 therein. The dome fits directly beneath the sifter tubular portion 32 so that dough balls passing from the sifter pass directly downward through opening 124 into dough ball collector 112 while breading which passes from the sifter foraminous portions is directed into the interior of the breading collector 108.

After the breading collector 108 has been removed and before it is interchanged with breading container 16, the bracket 114 is removed and placed in the pan which is to be positioned beneath the sifter. Dough balls within dough ball collector 112 are first discarded.

Figure 13:
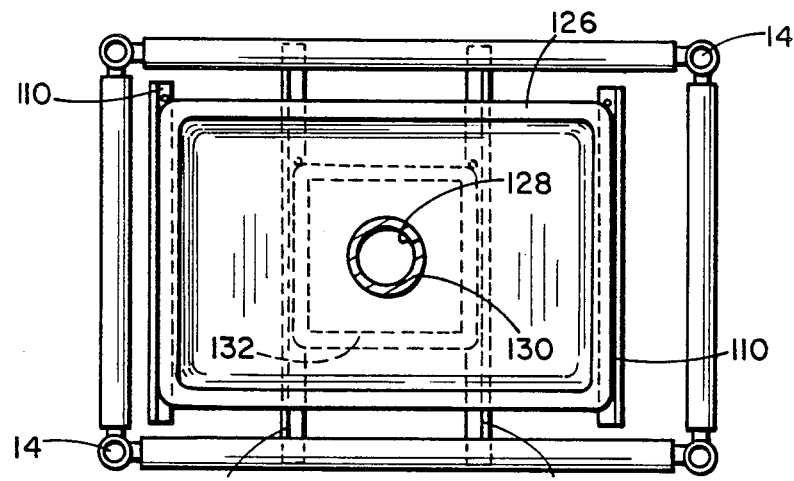
FIG. 13 is a cross-sectional view taken along the line 13—13 of FIG. 12, showing the arrangement of the breading collector.
Figure 12:
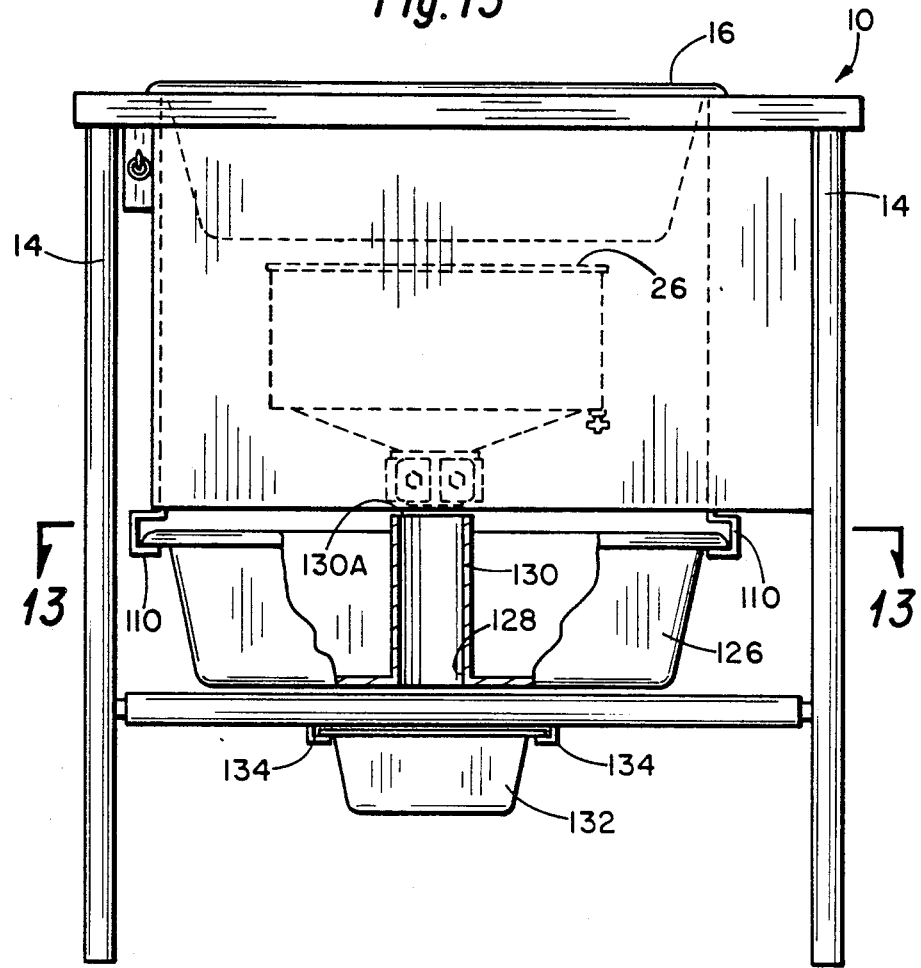
FIG. 12 is an elevational end view of an alternate embodiment of the invention.

FIGS. 12 and 13 show an alternate embodiment and some ways, a preferred embodiment of the invention. The table 10, the breading container 16, the sifter 26 and the mechanism for reciprocally oscillating the sifter are not shown in FIGS. 12 and 13, all of which are identical or substantially identical to that shown in FIGS. 1 through 4. The breading receptor identified as numeral 108 in FIGS. 1 through 4, however, is different and is identified by the numeral 126 in FIGS. 12 and 13. The breading receptor 126 in FIGS. 12 and 13 has a central opening 128 in the bottom and a tubular member 130 extending upwardly from the opening. The upper end 130A of the tubular portion 130 is, when the breading receptor 126 is in position, directly below and in alignment with the opening 34 in the bottom of sifter 26 so that dough balls separated by sifter 126 pass downwardly through the tubular portion 130 while breading which is sifted from the sifter sidewall and bottom portions pass into the interior of the breading receptor and exteriorly of the tubular portion 130. Dough ball collector 132 is supported below the breading receptor 126 and directly below the opening 128 therein so that dough balls passing downwardly pass into the dough ball receptor 132.

Thus, in the embodiment of FIGS. 12 and 13 the breading container 16 and the breading receptor 26 are not intended to be interchangeable. When a quantity of breading has been accumulated within breading receptor 126, it is removed and the contents thereof can be dumped back into the breading container 16. Dough balls can be removed from dough ball collector 132 as necessary. It can be seen that the dough ball collector pan 132 is slideably supported on brackets 134, however, this is exemplary only as it may be supported in a variety of ways.

Figure 14:
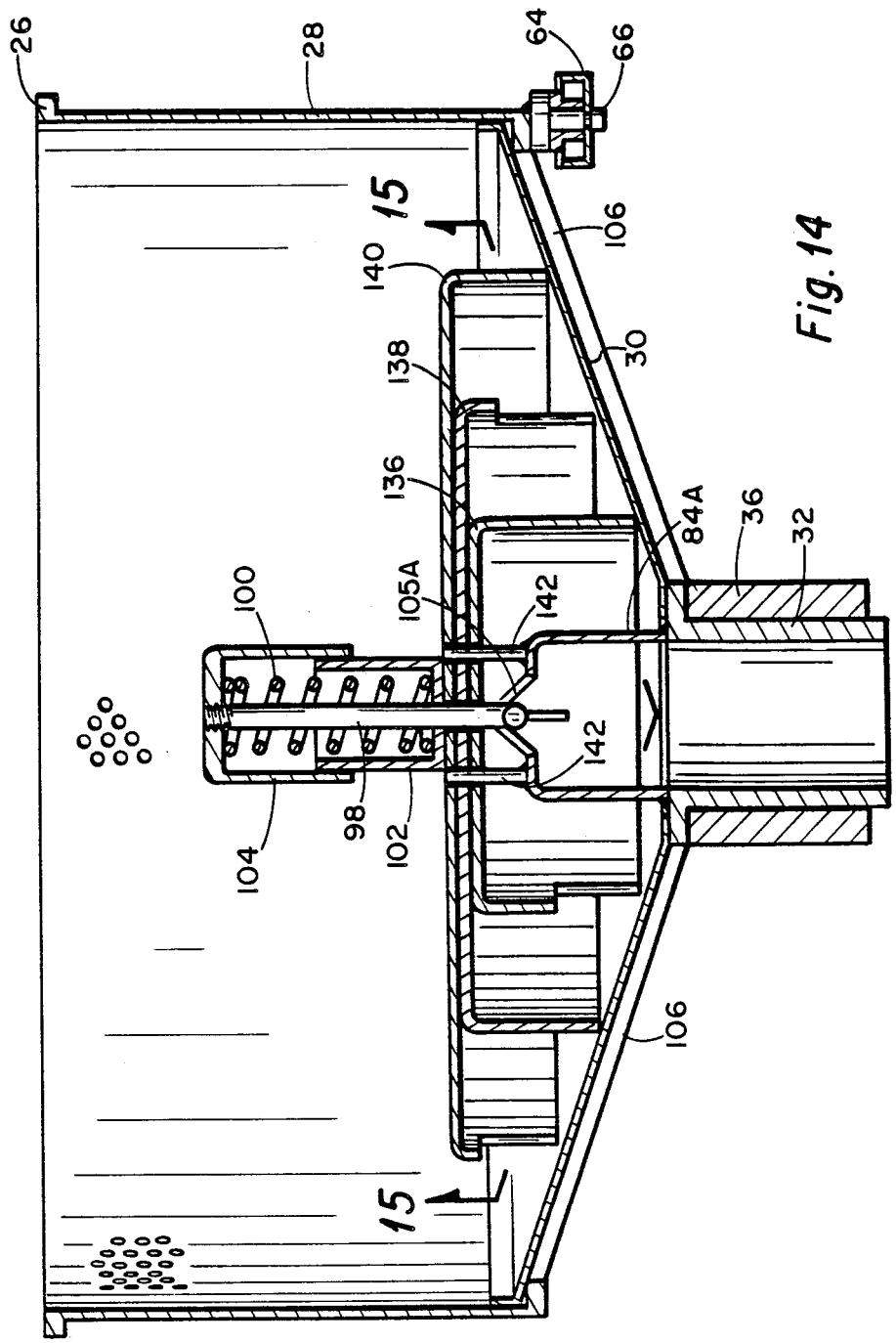
FIG. 14 is an enlarged scale, cross-sectional view of the sifter basket showing an alternate embodiment of the dough ball separator mechanism.
Figure 15:
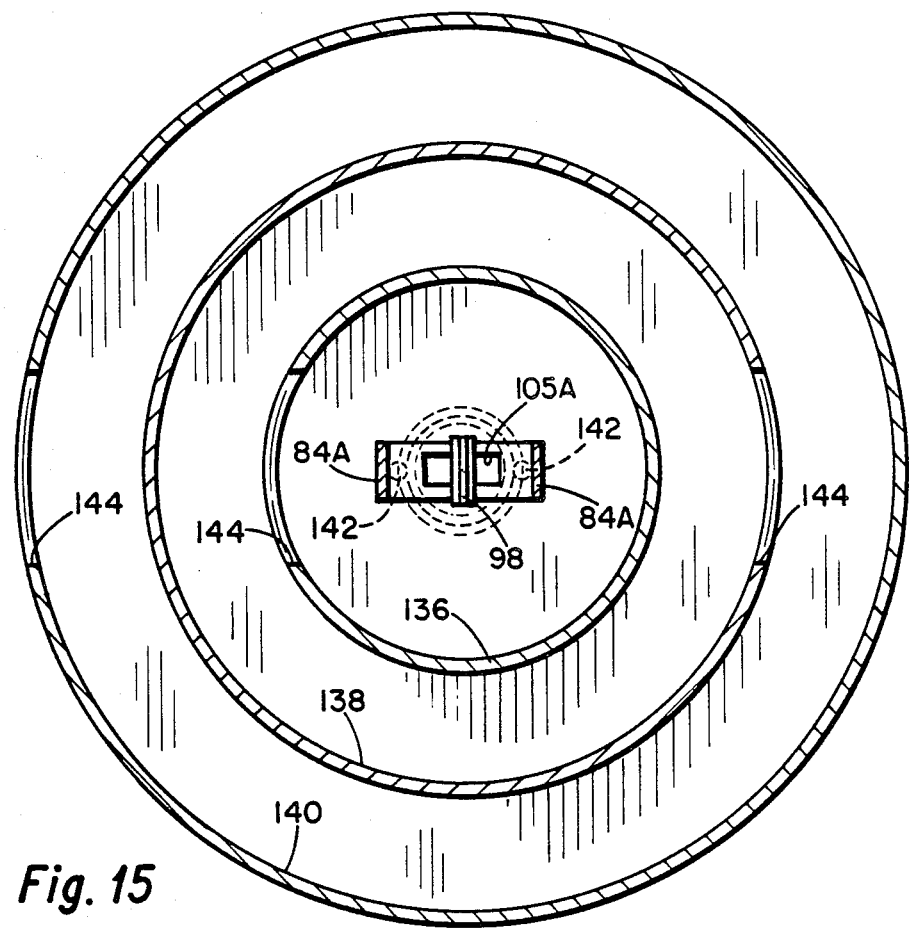
FIG. 15 is a cross-sectional view of the dough ball separator mechanism as taken along the line 15—15 of FIG. 14, showing the method of creating a labyrinth path for the dough balls to pass therethrough.

FIGS. 14 and 15 show an alternate embodiment of the dough ball separator within sifter 26. In the arrangement of FIGS. 14 and 15 bracket 84A is slightly shorter and three inverted cup-shaped members 136, 138 and 140 are all provided with flat tops and with downwardly extending cylindrical walls. Affixed to bracket 84A are pins 142 which extend upwardly through openings formed in the inverted cup-shaped member flat top portions. This keeps the inverted cup-shaped members in alignment so that the notch openings 144 are properly oriented. Further, it can be seen that the pins 142 may be used to limit the downward position of the inverted cup-shaped members so that the lower edges of the cylindrical portions thereof do not engage sifter bottom 30. In the arrangement of FIGS. 14 and 15 the inverted cup-shaped members 136, 138 and 140 may be separately formed as illustrated, or they can be integrally formed as one element.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for separating dough balls from reuseable breading comprising:
   a breading container for holding breading having doughballs co-mingled therewith, the breading container having an aperture in the bottom thereof for selectably discharging breading and co-mingled doughballs;
   a sifter having foraminous portions positioned below said breading container bottom aperture, the sifter having a bottom with a central opening therein;
   means to actuate said sifter to cause breading to be sifted through said foraminous portions;
   means within said sifter to cause dough balls to be separately discharged through said central opening;
   a breading collector means below said sifter to receive breading from said sifter; and
   a doughball collector means directly below said sifter central opening for receiving doughball passing therethrough.

2. An apparatus according to claim 1 wherein said dough ball collector is removeably supported within said breading collector.

3. An apparatus according to claim 1 wherein said breading collector has a bottom having an opening therein and including an upright tubular member communicating with said opening and in alignment with said sifter central opening and wherein said dough ball collector is positioned below said breading collector.

* * * * *